(12) United States Patent
Park et al.

(10) Patent No.: US 7,867,663 B2
(45) Date of Patent: Jan. 11, 2011

(54) HEAT EXCHANGING SYSTEM OF BATTERY PACK USING THERMOELECTRIC ELEMENT

(75) Inventors: JongMin Park, Daejeon (KR); Junill Yoon, Seoul (KR); Heekook Yang, Daejeon (KR); John E. Namgoong, Daejeon (KR); Jaesung Ahn, Busan (KR); Hyosang Woo, Daejeon (KR)

(73) Assignee: LG Chem, Ltd. (KR)

( * ) Notice: Subject to any disclaimer, the term of this patent is extended or adjusted under 35 U.S.C. 154(b) by 1128 days.

(21) Appl. No.: 11/548,054

(22) Filed: Oct. 10, 2006

(65) Prior Publication Data

US 2007/0231678 A1 Oct. 4, 2007

(30) Foreign Application Priority Data

Oct. 14, 2005 (KR) ........................ 10-2005-0096786

(51) Int. Cl.
*H01M 8/04* (2006.01)
(52) U.S. Cl. ......................... 429/436; 429/434; 429/435
(58) Field of Classification Search ................ None
See application file for complete search history.

(56) References Cited

U.S. PATENT DOCUMENTS

2002/0034682 A1* 3/2002 Moores et al. .............. 429/120
2003/0064283 A1* 4/2003 Uemoto et al. .............. 429/149

FOREIGN PATENT DOCUMENTS

| JP | 08148189 | 6/1996 |
|---|---|---|
| KR | 1020050018518 | 2/2005 |
| KR | 1020060036694 | 5/2006 |

* cited by examiner

*Primary Examiner*—Dah-Wei D Yuan
*Assistant Examiner*—Maria J Laios
(74) *Attorney, Agent, or Firm*—Cantor Colburn LLP

(57) ABSTRACT

Disclosed herein is a heat exchange system for battery packs, which controls the temperature of a medium- or large-sized battery pack including a plurality of unit cells such that the battery pack can be operated under the optimum operating conditions. The heat exchange system includes an air inlet port and an air outlet port formed at one side of a housing surrounding the outer surface of the battery pack so as to form a predetermined flow channel, through which air flows, a driving fan mounted in the flow channel for driving the air to flow through the flow channel, and a Peltier element mounted at the air inlet port for controlling the temperature of air introduced into the air inlet port. In the heat exchange system according to the present invention, the thermoelectric element is mounted inside the air inlet port, through which air for cooling the battery pack is introduced into the heat exchange system. Consequently, the present invention has the effect of easily controlling the optimum operating temperature of the battery pack, reducing influences caused by external conditions, and decreasing noise and vibration.

7 Claims, 2 Drawing Sheets

HEAT EXCHANGING SYSTEM OF BATTERY PACK USING THERMOELECTRIC ELEMENT

FIELD OF THE INVENTION

The present invention relates to a heat exchange system that is capable of controlling the temperature of a medium- or large-sized battery pack including a plurality of unit cells such that the battery pack can be operated under the optimum operating conditions, and, more particularly, to a heat exchange system for battery packs, which controls the temperature of a medium- or large-sized battery pack including a plurality of unit cells such that the battery pack can be operated under the optimum operating conditions, wherein the heat exchange system includes an air inlet port and an air outlet port formed at one side of a housing surrounding the outer surface of the battery pack so as to form a predetermined flow channel, through which air flows, a driving fan mounted in the flow channel for driving the air to flow through the flow channel, and a Peltier element mounted at the air inlet port for controlling the temperature of air introduced into the air inlet port.

BACKGROUND OF THE INVENTION

One of the biggest problems caused from vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). For this reason, a plurality of small-sized secondary batteries (unit cells) are connected in series or in parallel with each other so as to construct a battery module, and a plurality of battery modules are connected in parallel or in series with each other so as to construct a battery pack.

In such a high-output, large-capacity secondary battery, however, a large amount of heat is generated from the unit cells during the charge and the discharge of the unit cells. When the heat generated from the unit cells during the charge and the discharge of the unit cells is not effectively removed, heat is accumulated in the unit cells with the result that the unit cells are degraded. Consequently, it is necessary to provide a cooling system for vehicle battery packs, which are high-output, large-capacity secondary batteries.

Generally, a cooling system for vehicle battery packs is constructed in an air-cooling structure using air as a coolant. In the air-cooling structure, air outside or inside the vehicle is introduced to cool the battery pack, and is then discharged out of the vehicle. Consequently, various technologies for improving the efficiency of the cooling system have been developed.

For example, Japanese Unexamined Patent Publication No. 1996-148189 discloses a temperature control system in which heat transfer plates are attached to battery cells, respectively, heat dissipating fins are mounted at the outside of each heat transfer plate, and a cooling fan is operated depending upon the temperature of batteries, whereby the batteries are cooled. In addition, Korean Unexamined Patent Publication No. 2005-0018518 discloses a cooling system in which heat absorbing members are attached to batteries, respectively, and the batteries are cooled using air introduced by a cooling fan. These technologies improve the cooling efficiency of the batteries using the heat dissipating fins and the heat absorbing members in their own ways. However, the mounting of the heat dissipating fins at the respective battery cells or the attachment of the heat absorbing members to the respective battery cells complicates the overall construction of the corresponding system. As a result, the assembly process of the corresponding system is very complicated. In addition, the cooling efficiency is not obtained to a desired degree although such attempts are made as described above.

Meanwhile, the vehicles, such as the electric vehicles (EV) and the hybrid electric vehicles (HEV), may be operated under the tough conditions. For example, when a vehicle is at low temperature in the winter season, it is necessary to stop the operation of a cooling system such that a battery pack can be operated at the optimum operating temperature. Alternatively, it may be necessary to increase the temperature of air introduced into the battery pack such that the operating temperature of the battery pack can be controlled to the optimum temperature level. In this case, it is necessary to provide an additional device. In addition, when the unit cells of the battery pack already have low temperature, battery components may be damaged. Furthermore, the degradation of the battery components may be accelerated due to the abrupt increase of the temperature of the air introduced into the battery pack.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when a thermoelectric element is mounted inside an air inlet port, through which air for cooling a battery pack is introduced into a heat exchange system, it is possible to easily control the optimum operating temperature of the battery pack, reduce influences caused by external conditions, and decrease noise and vibration. The present invention has been completed based on these findings.

In accordance with the present invention, the above and other objects can be accomplished by the provision of a heat exchange system for battery packs, which controls the temperature of a medium- or large-sized battery pack including a plurality of unit cells such that the battery pack can be operated under the optimum operating conditions, wherein the heat exchange system comprises an air inlet port and an air outlet port formed at one side of a housing surrounding the outer surface of the battery pack so as to form a predetermined flow channel, through which air flows, a driving fan mounted in the flow channel for driving the air to flow through the flow channel, and a Peltier element mounted at the air inlet port for controlling the temperature of air introduced into the air inlet port.

The Peltier element is a thermoelectric element constructed such that, when electric current is supplied to the thermoelectric element, an endothermic reaction and an exothermic reaction occur at opposite ends of the thermoelectric element, respectively. The ends at which the endothermic reaction and the exothermic reaction occur are decided depending upon directions in which the electric current is supplied to the thermoelectric element.

Preferably, a first heat conduction member is located inside the air inlet port and a second heat conduction member is located outside the air inlet port while the Peltier element is interposed between the first heat conduction member and the second heat conduction member, whereby the control of the temperature of air by the Peltier element is more easily performed, and therefore, the operating efficiency of the Peltier element is improved.

Preferably, first heat conduction member and the second heat conduction member are constructed in a structure in which a plurality of fins made of a material having high heat conductivity are arranged in line, whereby the contact area between the first and second heat conduction members and the air is maximized.

The driving fan serves to provide a driving force necessary for air outside the heat exchange system to flow along the battery pack through the air inlet port and flow out of the heat exchange system through the air outlet port. The driving fan may be mounted at any position in the flow channel. Preferably, the driving fan is mounted in front of or at rear of the Peltier element in the air inlet port.

The operation of the Peltier element and/or the driving fan may be controlled by a control unit mounted in the battery pack or a control unit of a device in which the battery pack is mounted. Preferably, the operation of the Peltier element and/or the driving fan is controlled by a battery management system (BMS) of the battery pack based on signal information of thermistors mounted at battery modules or the unit cells of the battery pack for measuring the temperature thereof.

Consequently, when the temperature of the battery pack is too high as a result of the determination as to information of the overall temperature state of the battery pack detected by the thermistors, electric current is supplied to the end of the Peltier element which is directed to the air inlet port in the direction in which the endothermic reaction is induced, and the driving fan is operated. As a result, cooled air is supplied into the heat exchange system through the air inlet port.

When the temperature of the battery pack is too low, on the other hand, electric current is supplied to the end of the Peltier element which is directed to the air inlet port in the direction in which the exothermic reaction is induced, and the driving fan is operated. As a result, heated air is supplied into the heat exchange system through the air inlet port.

According to circumstances, when it is determined that the temperatures of the unit cells or the battery modules detected by the plurality of thermistors are not uniform, only the driving fan is operated, while no electric current is supplied to the Peltier element, so as to rapidly circulate the air, whereby the overall temperature of the battery pack is uniformly controlled.

In a preferred embodiment, the air inlet port and the air outlet port are adjacent to each other while the Peltier element is interposed between the air inlet port and the air outlet port. More preferably, the first and second heat conduction members are attached to opposite major surfaces of the Peltier element, and first heat conduction member is located inside the air inlet port, whereas the second heat conduction member is located inside the air outlet port. In the heat exchange system with the above-stated construction, the second heat conduction member is located inside the air outlet port, unlike the previously described embodiment of the present invention in which the second heat conduction member is located outside the air inlet port. Consequently, the overall size of the heat exchange system is greatly reduced. Also, air passes through both the first heat conduction member and the second heat conduction member. Consequently, the Peltier element has high heat conductivity, and therefore, the operating efficiency of the Peltier element is improved.

Preferably, in the structure in which the heat conduction members are located inside the air inlet and outlet ports, respectively, the end of the air inlet port which directly contacts air outside the heat exchange system and the end of the air outlet port which directly contacts air outside the heat exchange system are not positioned on the same plane. For example, the end of the air inlet port may communicate with a trunk or a passenger section of a vehicle, and the end of the air outlet port may communicate with the outside of the vehicle. Consequently, the reintroduction of air discharged through the air outlet port into the heat exchange system through the air inlet port is effectively prevented.

Preferably, the hermetically-sealed type housing has a partition formed at one or more inner surfaces thereof for dividing a heat exchange medium into predetermined flow channels. Also preferably, the housing is made of an insulating material. The details of the partition structure for dividing the flow channels are disclosed in Korean Patent Application No. 2004-85765, which has been filed in the name of the applicant of the present patent application. The disclosure of the above-mentioned patent application is hereby incorporated by reference as if fully set forth herein.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
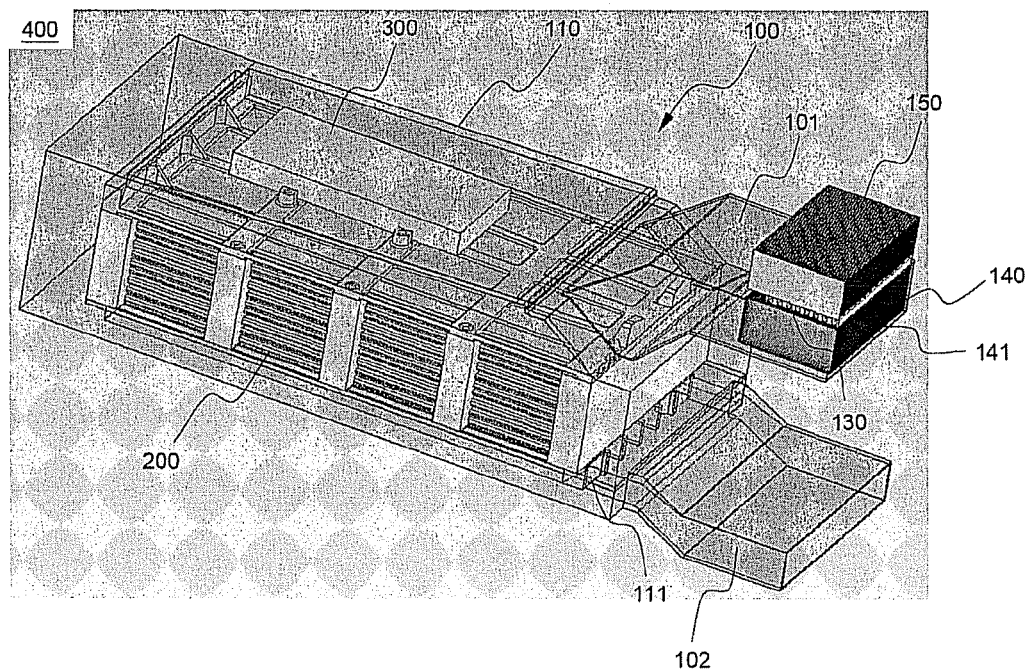
FIG. 1 is a perspective view illustrating a battery system including a heat exchange system according to a preferred embodiment of the present invention.

FIG. 1 typically illustrates a battery system including a heat exchange system according to a preferred embodiment of the present invention. For easy understanding of the drawing, most parts of the battery system are shown as a see-through view.

Referring to FIG. 1, a battery system 400 is constructed in a structure in which a battery pack 200 and a control unit 300 are mounted in a heat exchange system 100. The battery pack 200 is constructed in a structure in which a plurality of pouch-shaped batteries, as unit cells, are stacked one on another, and are then mounted to a sheathing member, such as a cartridge or a frame, while the batteries are electrically connected with each other. The operation of the battery pack 200 is controlled by the control unit 300, such as a battery management system (BMS).

The heat exchange system 100 is constructed in a structure in which an air inlet port 101 and an air outlet port 102 are formed at one side of a housing 110 forming a flow channel for air such that the air inlet port 101 and the air outlet port 102 are separated from each other, a driving fan (not shown) for driving the air to flow is mounted in the housing 110, and a Peltier element 130 is mounted at the air inlet port 101.

At the Peltier element 130 are attached a first heat conduction member 140 and a second heat conduction member 150. The first heat conduction member 140 is located inside the air inlet port 101. The second heat conduction member 150 is located outside the air inlet port 101 while the Peltier element 130 is interposed between the first heat conduction member 140 and the second heat conduction member 150. Consequently, when air is introduced into the heat exchange system 100 through the air inlet port 101, the air passes through the first heat conduction member 140.

The first heat conduction member 140 and the second heat conduction member 150 are constructed in a structure in which a plurality of fins 141 are arranged in line in the introduction direction of the air so as to increase the contact area between the first heat conduction member 140 and the air and the contact area between the second heat conduction member 150 and the air. The fins 141 are made of a material having high heat conductivity.

Figure 2:
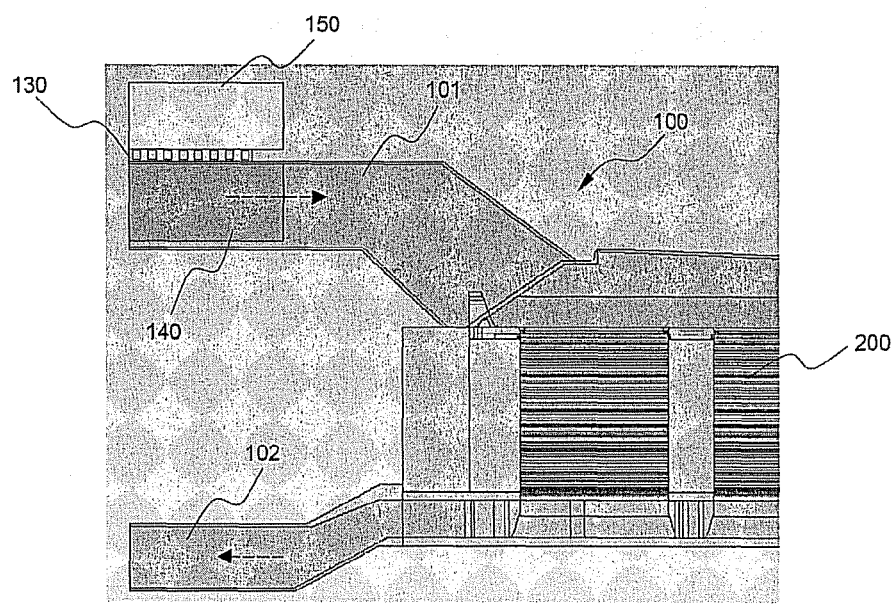
FIG. 2 is a vertical sectional view, enlarged in part, illustrating an air inlet port and an air outlet port of the heat exchange system shown in FIG. 1.

FIG. 2 is an enlarged vertical sectional view of the heat exchange system shown in FIG. 1, illustrating a process for removing heat from the introduced air.

Referring to FIG. 2, when the temperature of the battery pack 200 is higher than the optimum operating temperature level, electric current is supplied to the Peltier element 130 in one direction by the operation of the BMS (not shown) such that an endothermic reaction is induced at the end adjacent to the first heat conduction member 140, and an exothermic reaction is induced at the end adjacent to the second heat conduction member 150. As a result, the air is cooled in the air inlet port 101, and is then supplied into the heat exchange system 100. Subsequently, the air absorbs heat generated from the battery pack 200, and is then discharged out of the heat exchange system 100 through the air outlet port 102.

When the temperature of the battery pack 200 is lower than the optimum operating temperature level, on the other hand, electric current is supplied to the Peltier element 130 in the opposite direction such that an exothermic reaction is induced at the end adjacent to the first heat conduction member 140, and an endothermic reaction is induced at the end adjacent to the second heat conduction member 150. As a result, the air is heated in the air inlet port 101. The heated air increases the temperature of the battery pack 200 to an appropriate temperature level, and is then discharged out of the heat exchange system 100 through the air outlet port 102.

Figure 3:
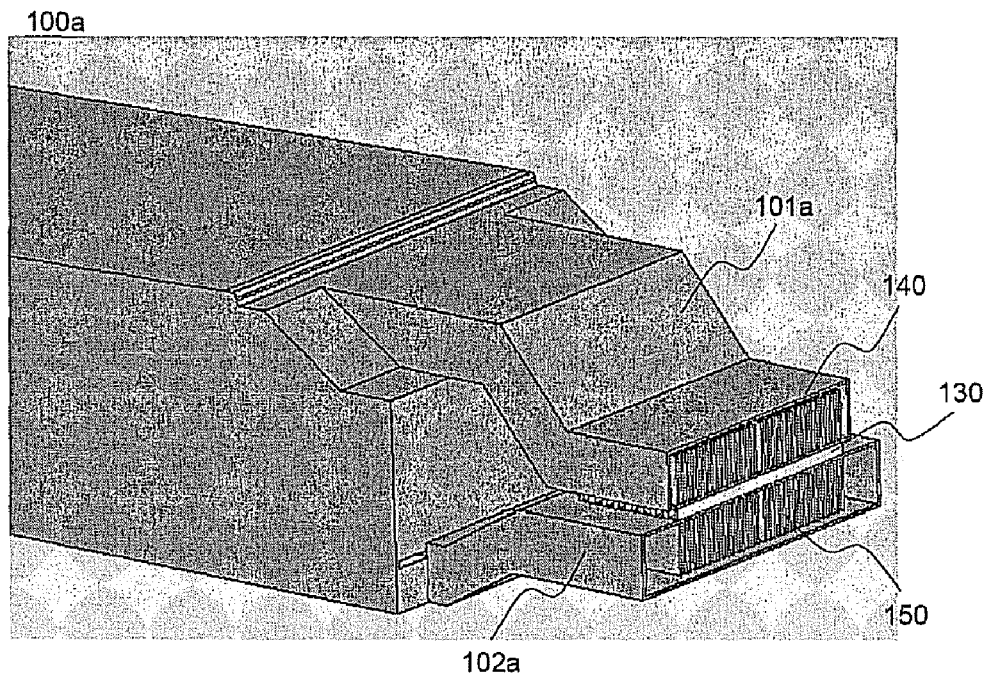
FIG. 3 is a perspective view, in part, illustrating a heat exchange system according to another preferred embodiment of the present invention.

FIG. 3 is a perspective view, in part, illustrating a heat exchange system according to another preferred embodiment of the present invention.

Referring to FIG. 3, a heat exchange system 100a is constructed in a structure in which an air inlet port 101a and an air outlet port 102a are located adjacent to each other while a Peltier element 130 is interposed between the air inlet port 101a and the air outlet port 102a. Specifically, a first heat conduction member 140, which is attached to the top of the Peltier element 130, is located inside the air inlet port 101a, and a second heat conduction member 150, which is attached to the bottom of the Peltier element 130, is located inside the air outlet port 102a. Consequently, the overall size of the heat exchange system 100a is greatly reduced as compared to the size of the heat exchange system 100 shown in FIG. 1. Furthermore, the first heat conduction member 140 and the second heat conduction member 150 have high heat conductivity due to the flow of air in the air inlet port 101a and the air outlet port 102a, which will be described below in more detail with reference to FIG. 4.

Figure 4:
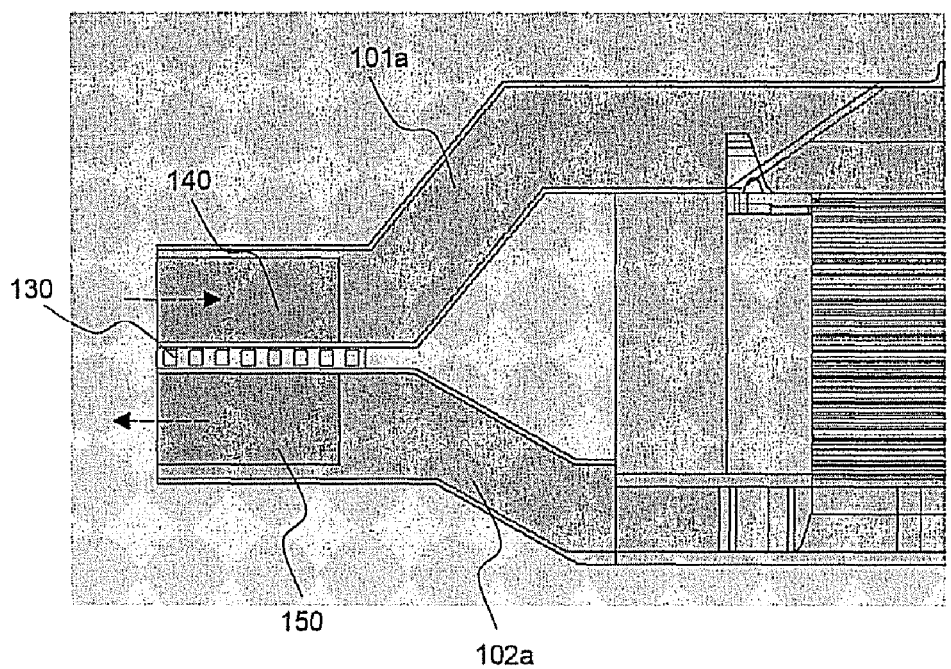
FIG. 4 is a vertical sectional view of FIG. 3.

FIG. 4 is a vertical sectional view of the heat exchange system 100a shown in FIG. 3.

Referring to FIG. 4, air introduced into the heat exchange system 100a is cooled or heated in the air inlet port 101a by the Peltier element 130 according to the same principle as described with reference to FIG. 2. Low-temperature or high-temperature heat transfer from the Peltier element 130 to the air is accomplished by the first heat conduction member 140 located inside the air inlet port 101a while the first heat conduction member 140 is attached to the top of the Peltier element 130 with high efficiency.

On the other hand, the second heat conduction member 150 attached to the bottom of the Peltier element 130 is located inside the air outlet port 102a. As a result, the second heat conduction member 150 is in direct contact with the air flowing through the air outlet port 102a. Consequently, the amount of air contacting the second heat conduction member 150 per unit time is greatly increased as compared to the heat exchange system 100 in which the second heat conduction member is located outside the air inlet port. This structure assists to rapidly decrease or increase the temperature of the second heat conduction member 150 when electric current is supplied to the Peltier element 130, and therefore, the exothermic reaction or the endothermic reaction occurs at the second heat conduction member 150. Consequently, the thermal control of the second heat conduction member 150 further increases the operating efficiency of the Peltier element 130.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the heat exchange system according to the present invention has the thermoelectric element mounted inside the air inlet port, through which air for cooling the battery pack is introduced into the heat exchange system. Consequently, the present invention has the effect of easily controlling the optimum operating temperature of the battery pack, reducing influences caused by external conditions, and decreasing noise and vibration.

What is claimed is:

1. A heat exchange system for battery packs, which controls the temperature of a medium- or large-sized battery pack including a plurality of unit cells, such that the battery pack can be operated under the optimum operating conditions, wherein the heat exchange system comprises:
   an air inlet port and an air outlet port formed at one side of a housing surrounding the outer surface of the battery pack so as to form a predetermined flow channel, through which air flows, and in which air introduced from the air inlet port, passes through the battery pack and then flows to the air outlet port;
   a driving fan mounted in the flow channel for driving the air to flow through the flow channel;

a Peltier element mounted at the air inlet port for controlling the temperature of air introduced into the air inlet port;

first and second heat conduction members attached to opposite major surfaces of the Peltier element, at which an endothermic reaction and an exothermic reaction occur depending upon directions in which electric current is supplied to the Peltier element, the first heat conduction member being located inside the air inlet port, and the second heat conduction member being located outside the air inlet port;

wherein the air inlet port and the air outlet port are adjacent to each other while the Peltier element is interposed between the air inlet port and the air outlet port, and the second heat conduction member is located inside the air outlet port.

2. The heat exchange system according to claim 1, wherein the heat conduction members are constructed in a structure in which a plurality of fins made of a material having heat conductivity are arranged in line.

3. The heat exchange system according to claim 1, wherein the operation of the driving fan and/or the Peltier element is controlled by a control unit mounted in the battery pack or a control unit of a device in which the battery pack is mounted.

4. The heat exchange system according to claim 3, wherein the operation of the driving fan and/or the Peltier element is controlled by a battery management system (BMS) of the battery pack based on signal information of thermistors mounted at battery modules or the unit cells of the battery pack for measuring the temperature thereof.

5. The heat exchange system according to claim 1, wherein the housing has a partition formed at one or more inner surfaces thereof for dividing a heat exchange medium into predetermined flow channels.

6. The heat exchange system according to claim 1, wherein the housing is made of an insulating material.

7. The heat exchange system according to claim 1, wherein the end of the air inlet port and the end of the air outlet port are not positioned on the same plane.

* * * * *